(12) United States Patent
Chou et al.

(10) Patent No.: US 7,533,115 B2
(45) Date of Patent: May 12, 2009

(54) METHOD FOR MANAGING PERSISTENT FEDERATED FOLDERS WITHIN A FEDERATED CONTENT MANAGEMENT SYSTEM

(75) Inventors: Kehsing J. Chou, San Jose, CA (US); Basuki N. Soetarman, Los Gatos, CA (US); Robert Nelson Summers, Hollister, CA (US); Mimi Phuong-Thao Vo, San Jose, CA (US); Alan Tsu-I Yaung, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 309 days.

(21) Appl. No.: 10/664,200

(22) Filed: Sep. 16, 2003

(65) Prior Publication Data

US 2005/0060337 A1    Mar. 17, 2005

(51) Int. Cl.
 *G06F 7/00*    (2006.01)
(52) U.S. Cl. .......................................... 707/102; 707/3
(58) Field of Classification Search ................ 707/4, 707/9, 102, 103
See application file for complete search history.

(56) References Cited

U.S. PATENT DOCUMENTS 6,272,488 B1 *   8/2001  Chang et al. ................... 707/4
6,370,541 B1 *   4/2002  Chou et al. ............. 707/103 X
2002/0026443 A1   2/2002  Chang et al. .................. 707/10
2003/0004931 A1   1/2003  Soetarman et al. ............. 707/3

OTHER PUBLICATIONS

Software Announcement, Mar. 25, 2003, IBM Corporation (pp. 1-5).*
Software Announcement, Aug. 26, 2003, IBM Corporation (pp. 1-16).*
Messages and Codes, Version 8 Release 2, Second Edition, IBM Corporation, pp. 1-239, Mar. 2003.*

* cited by examiner

*Primary Examiner*—Cheyne D Ly
(74) *Attorney, Agent, or Firm*—Sughrue Mion, PLLC

(57) ABSTRACT

A persistent federated folder within a federated content management system can be used to save federated search results, to act as a container in a workflow process, or a container for a set of documents or folders with similar characteristics. The federated folder and its associated storage structure have the capability to save its instances persistently. The federated folder operations can selectively create, retrieve, update, and/or delete an instance of a federated folder in addition to adding, retrieving updating and deleting its parts and its members. Seamless integration with the federated query is provided to operate on the federated folder transparently regardless of the locality of the user or the datastores the user is searching. Access rights for federated folders are enforced according to user's general privileges.

27 Claims, 6 Drawing Sheets

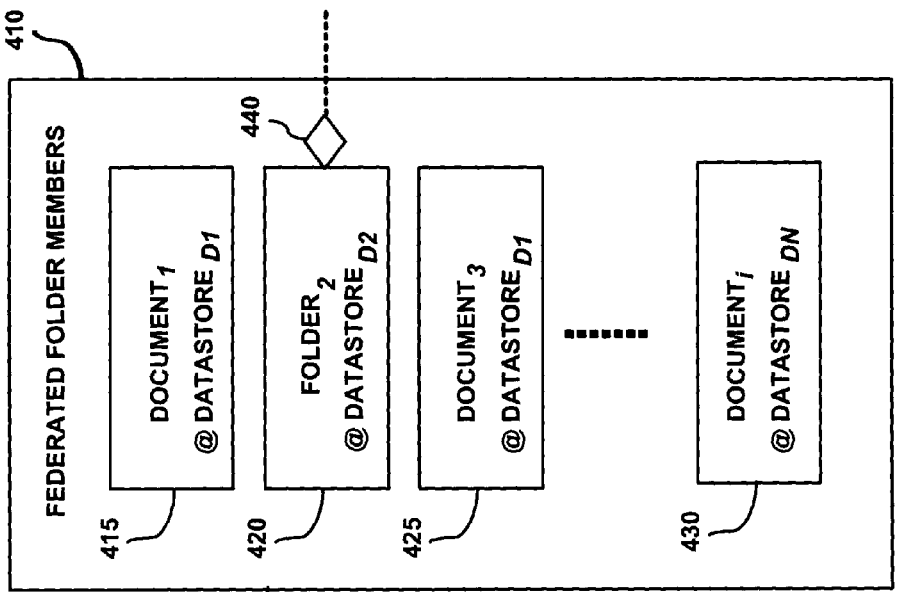
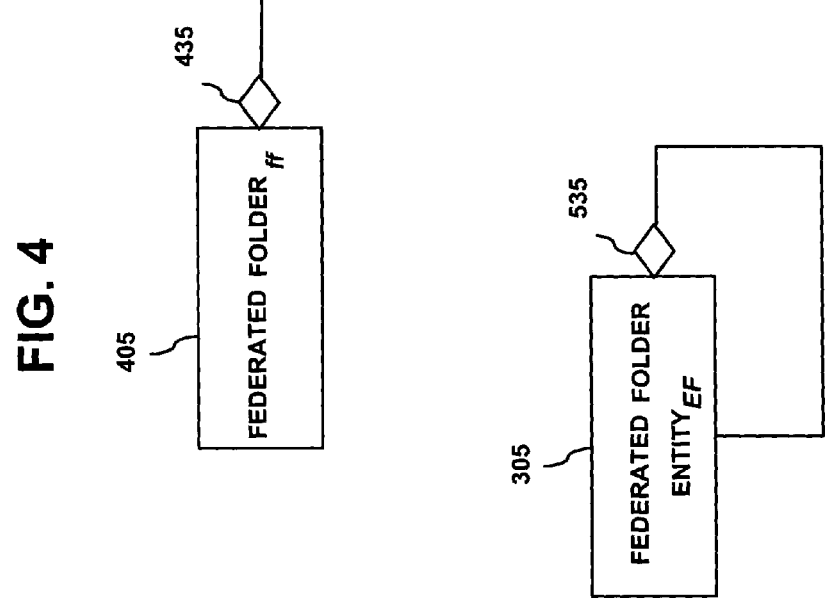

METHOD FOR MANAGING PERSISTENT FEDERATED FOLDERS WITHIN A FEDERATED CONTENT MANAGEMENT SYSTEM

FIELD OF THE INVENTION

The present invention generally relates to the field of database management systems, and particularly to content management systems. More specifically, this invention relates to a design and implementation of a client/server framework for modeling and managing persistent storage of objects within a federated content management system.

BACKGROUND OF THE INVENTION

For many years, businesses have used computers to manage information such as numbers and text, primarily in the form of coded data. However, business data represents only a small portion of the world's information. As storage, communication, and information processing technologies advance and the cost of these technologies decrease, it becomes more feasible to digitize and store large volumes of other various types of data. Once digitized and stored, the data should be available for distribution on demand to users at their place of business, home, or other locations.

New digitization techniques have emerged in the last decade to digitize images, audio, and video, giving rise to a new type of digital multi-media information. These multimedia objects are significantly different from the business data that computers managed in the past, often requiring more advanced information system infrastructures with new capabilities, such as "digital libraries" or content management systems.

New digital technologies can do much more than replace physical objects with their electronic representations. These technologies enable instant access to information; support fast, accurate, and powerful search mechanisms; provide new "experiential" (i.e., virtual reality) user interfaces; and implement new ways of protecting the rights of information owners. These properties make digital library solutions attractive and acceptable to corporate information service organizations as well as to the information owners, publishers, and service providers.

Generally, business data is created by a business process, such as an airline ticket reservation, a deposit at a bank, or a claim processing at an insurance company. Most of these processes have been automated by computers and produce business data in digital form such as text and numbers, i.e., structured coded data. In contrast, the use of multimedia data is not fully predictable. Consequently, multimedia data cannot be fully pre-structured because it is the creative result of a human being or it is the digitization of an object of the real world such as, for example, x-rays or geophysical mapping, rather than a computer algorithm.

The average size of business data in digital form is relatively small. A banking record that comprises a customer's name, address, phone number, account number, balance, etc., and may represent only a few hundred characters and a few hundreds or thousands of bits. The digitization of multimedia information such as image, audio, or video produces a large set of bits called an "object" or binary large objects ("blobs"). For example, a digitized image could take as much as 30 MB of storage. The digitization of a movie, even after compression, may take as much as 3 GB to 4 GB of storage.

Multimedia information is typically stored as much larger objects, ever increasing in quantity and therefore requiring special storage mechanisms. Conventional business computer systems have not been designed to directly store such large objects. Specialized storage technologies may be required for certain types of information such as media streamers for video or music. Because certain multimedia information needs to be preserved or archived, special storage management functions are required for providing automated backup and migration to new storage technologies as they become available and as old technologies become obsolete.

For performance reasons, multimedia data is often placed in the proximity of the users with the system supporting multiple distributed object servers. Consequently, a logical separation between applications, indices, and data is required to ensure independence from any changes in the location of the data.

The indexing of business data is often embedded into the data itself. When the automated business process stores a person's name in the column "NAME", it actually indexes that information. Multimedia information objects usually do not contain indexing information. Developers or librarians typically create this "meta data" or "metadata". The indexing information for multimedia information is typically kept in standard business-like databases separated from the physical object.

In a digital library or a content management system, the multimedia object can be linked with the associated indexing information since both are available in digital form. Integration of this legacy catalog information with the digitized object is one of the advantages of content management or digital library technology. Different types of objects can be categorized differently as appropriate for each object type. Existing standards such as, for example, MARC records for libraries or Finding Aids for archiving of special collections can be used when appropriate.

The indexing information used for catalog searches in physical libraries is typically the name of the book, author, title, publisher, ISBN, etc., enriched by other information created by librarians. This other information may comprise abstracts, subjects, keywords, etc. In contrast, digital libraries may contain the entire content of books, images, music, films, etc.

Technologies are desired for full text searching, image content searching (searching based on color, texture, shape, etc.), video content searching, and audio content searching. Each type of search is usually conducted by a specialized search engine. The integrated combination of catalog searches, for example, using SQL in conjunction with content searches provides powerful search and access functions. These technologies can also be used to partially automate further indexing, classification, and abstracting of objects based on content. The term multi-search refers to searches employing more than one search engine, for example text and image search.

To harness the massive amounts of information spread throughout these many networks of varying types of content, a user should be able to simultaneously search numerous storage facilities without considering the particular implementation of each storage facility. Object-oriented approaches are generally better suited for such complex data management. The term "object-oriented" refers to a software design method that uses "classes" and "objects" to model abstract or real objects. An "object" refers to the main building block of object-oriented programming, and is a programming unit that has both data and functionality (i.e., "methods"). A "class" defines the implementation of a particular kind of object, the variables and methods the object uses, and the parent class to which the object belongs. In this context, the term datastore is a used to refer to a generic data storage facility, whereas heterogeneous is used to indicate that the datastores need not be of the same type. A federated datastore is composed as an aggregation of several heterogeneous datastores configured dynamically by the application user.

Currently, the ability to search across many different types of datastores in many different geographical locations is achieved by the use of a federated datastore system, which provides mechanisms for conducting a federated multi-search and update across heterogeneous datastores. For example, each datastore may represent a company or division of a company. A division manager requires access to his or her local datastore but not to the datastores of other division managers. Conversely, a corporate officer may require access to the datastores of all the divisions, located, for example, in New York, San Francisco, London, and Hong Kong. A federated system would search all the databases, combine and aggregate the data into one report, and present the report to the corporate officer.

One example of a federated datastore system is the IBM Enterprise Information Portal or EIP that allows federated searches across heterogeneous datastores, processes the results and updates according to the application logic. This functionality is provided by a consistent set of object oriented classes within the EIP framework implemented in, for example, Java and C++/ActiveX. These classes provide the query processing capabilities and aggregate the results from various datastores participating in the federation.

Content management datastores provide modeling constructs to represent and manipulate document and folder metaphors. Such a model is referred to as content management data model. Within the content management system, a folder has some attributes and may contain some other documents and folders. A document represents a physical document such as an insurance claim and has some attributes as well as zero or more textual or binary contents. These contents are also known as parts. Examples of textual content could be an insurance policy in an XML format, or an abstract of a technical report. Binary contents could be the JPEG picture of an automobile involved in an accident, or a video clip of a news report.

A federated datastore shares the same basic interface as other datastores such that the interface provides access transparency within the datastore family. Consequently, the federated datastore also provides the same modeling constructs consistent with other datastores, which sometimes referred to as a federated content management data model or federated content model for short.

Applications using federated searches and updates require a seamless extension of the federated modeling constructs of documents and folders. That is, the users wish to extend the document and folder concepts to span across disparate datastores and be able to search and manipulate them transparently. Specifically, the extensions should include the ability to perform federated search and update on federated folders and documents.

While the federated system has proven to be quite useful, additional enhancements would extend the capabilities of such a system. For example, the results of the search performed by the federated system are not persistent; i.e., the search results are not saved for later use by the client of the federated system. Saving the results of the search would allow the client to manipulate the search results, forward the search results to other users, use the search results in a report, save the results for later comparison, route the results into a document workflow, and so forth. The extension of the capability of the federated system does not need to be limited to support persistency of the search results alone. In general, the extension covers the persistency aspect of the federated content model which includes the capability to manage federated folders.

What is therefore needed is a system, a service, a computer program product, and an associated method that would allow users to save the search results in a persistent manner, to manage federated folder, and to fully support a persistent federated content model. The need for such an implementation has heretofore remained unsatisfied.

SUMMARY OF THE INVENTION

The present invention satisfies this need, and presents a system, a service, a computer program product, and an associated method (collectively referred to herein as "the system" or "the present system") for managing persistent federated folders and other persistent operations for the federated content data model within a federated content management system.

Federated folders can contain objects or members that are documents and/or folders stored in other heterogeneous datastores. A folder that is a member of a federated folder can also be a federated folder. A federated folder has attributes and may have parts associated with it. Federated folders are persistently stored in a federated datastore. A federated folder can be used to save federated search results, to act as a container in a workflow process, or a container for a set of documents or folders with similar characteristics.

An exemplary scenario related to federated search would be to perform a federated search, obtain the results, and aggregate the results in a federated folder. The aggregated results can be further shared by several application programs (i.e., clients or applications) without performing a separate search. Based on a specific business need, single or multiple search results can be filtered and saved persistently in a federated folder by a client. The information collected in the federated folder could be shared as a knowledge base for making further business decisions.

Another exemplary scenario relates to workflow applications. The client may perform a federated search, obtain the results, and aggregate them in a federated folder. The federated folder may be further routed in a designated workflow process. During the workflow process, the members of the federated folder can be used to determine the next action taken in a workflow process.

The federated folder and its associated storage structure have the capability to save its instances persistently. The federated folder operations can, for example, create, retrieve, update, and/or delete instances of the federated folder in addition to selectively adding, retrieving, updating, and/or deleting its parts and its members.

Seamless integration with the federated query is provided to operate on the federated folder transparently regardless of the locality of the client (i.e., user or application) or the datastores the user is searching. The federated folder limits access rights as associated with the user general privileges. The administrative support is provided for creating and administering federated folders.

An implementation of the federated content data model implies support for persistent operations on all components of the model, for example documents, folders, and parts. Such persistent operations comprise Creation, Retrieval, Update, and Delete operations, typically referenced as the CRUD operations. In a single datastore or non-federated setting, these CRUD operations involve components residing in that datastore.

The present system extends the concept of a content data model and its CRUD operations into a federated content data model. Components of the federated content data model may reside in several heterogeneous datastores. However, the federated content data model provides a physical transparency resembling a system in which all components are stored in a single datastore. In this respect, the users of a federated datastore view the same content data model as users of a single, non-federated datastore.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

FIG. 4 is a schematic illustration of an instance of the persistent federated folder of FIG. 3, depicting instances of folder members (i.e., documents and/or folders) originating from heterogeneous datastores;

FIG. 5 is a schematic illustration of a special case of the federated folder data model of FIG. 3 depicting its recursive properties in which the folder members belong to the same entity as the entity of the federated folder itself;

DETAILED DESCRIPTION OF PREFERRED EMBODIMENTS

The following definitions and explanations provide background information pertaining to the technical field of the present invention, and are intended to facilitate the understanding of the present invention without limiting its scope:

API (application program interface): A specific method prescribed by a computer operating system or by another application program by which a programmer writing an application program can make requests of the operating system or another application.

Beans: independent Java program modules that are called for and executed, and used primarily for developing user interfaces at the client side.

Class: In object-oriented technology, a user-defined data type that defines a collection of objects that share the same characteristics. An object, or class member, is one instance of the class. Concrete classes are designed to be instantiated.

Instance: In object technology, a member of a class; for example, "Elizabeth" is an instance of the class "queen." When an instance is created, the initial values of its instance variables are assigned.

Instantiate: In object-oriented technology, to create an object of a specific class.

Datastore: The term datastore is a used to refer to a generic data storage facility, for example a relational database, flat file, etc.

Federation: A federated data system refers to a loosely-coupled aggregation of several data servers, in which each data server can operate and functions individually or participate in a federation with other data servers.

Heterogeneous datastores: Indicate that the datastores do not need to be of the same type, for example each datastore may be based on a different theory of data model, such as relational data model, Digital Library/Visual Info, or Domino Extended Search (DES).

Figure 1:
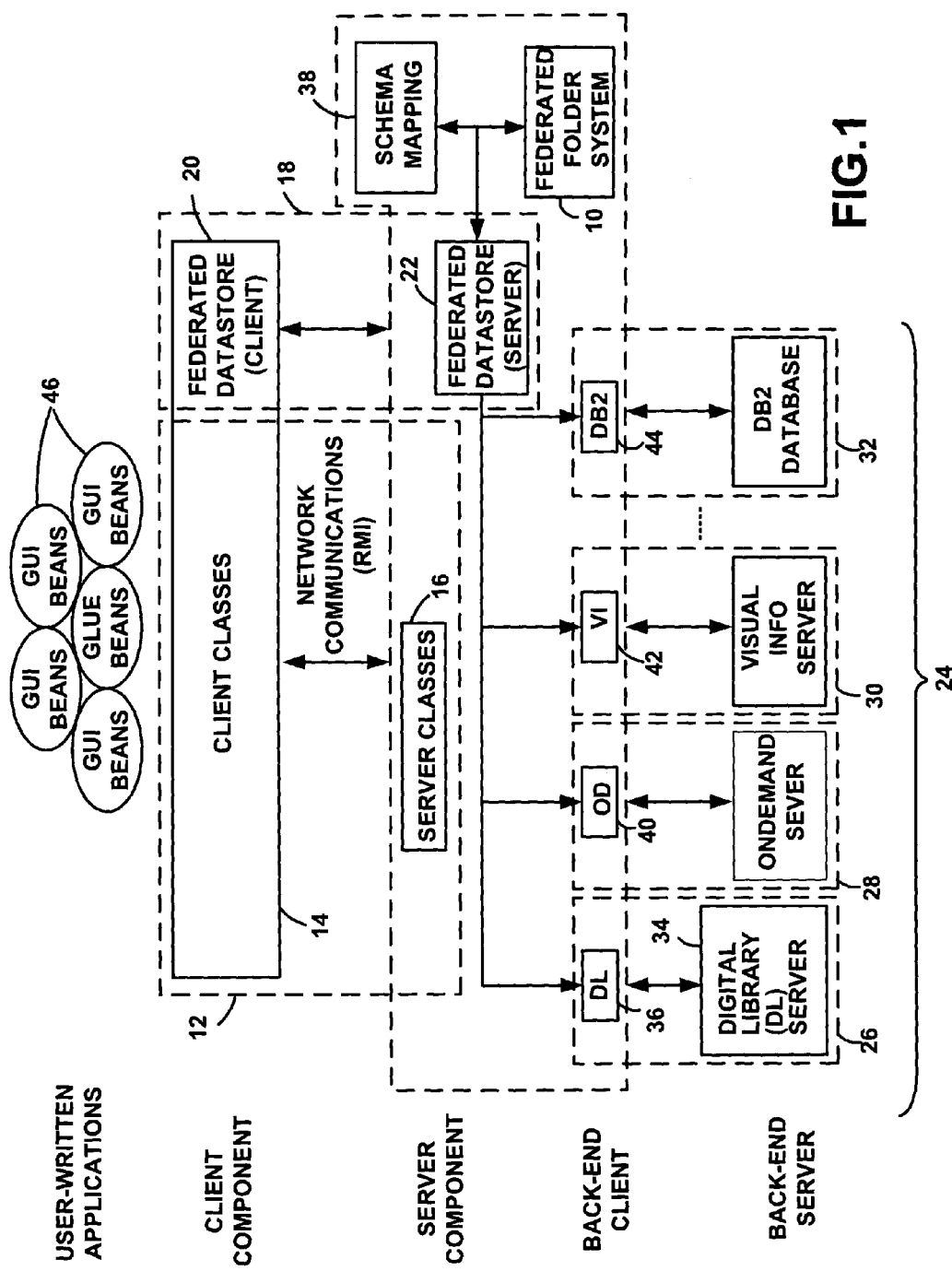
FIG. 1 is a schematic illustration of an exemplary environment supporting a federated content management system in which a persistent federated folder system of the present invention may be used.

FIG. 1 illustrates an exemplary high-level architecture of a federated content management system supporting the federated folder system 10 that comprises a software programming code or computer program product that is typically embedded within, or installed on a computer. Alternatively, federated folder system 10 can be saved on a suitable storage medium such as a diskette, a CD, a hard drive, or like devices. The federated folder system 10 may, for example, be based on the IBM design of the Enterprise Information Portal or EIP Class Library Framework, the IBM Content Management Family Java Application Programming Interface (API).

The EIP framework 12 is comprised of Java EIP client classes 14 and server classes 16. In particular, EIP framework 12 is a set of classes that provide access and manipulation of local or remote data stored in IBM Content Management family storage facilities. EIP framework 12 uses Java APIs based on OMG-Object Query Services (OQS) and a Dynamic Data Object protocol that is part of OMG/Persistence Object Services.

The Java APIs provide several multi-search capabilities, for example, searching within a given datastore using one or a combination of supported query types comprising parametric query, text query, and image query. Parametric queries require an exact match on the condition specified in the query predicate and the data values stored in the datastore.

A text queries search on the content of text fields for approximate matches to the given text search expression, e.g., the existence (or non-existence) of certain phrases or wordstems. Image queries search on the content of image fields for approximate match with the given image search expressions, e.g., image with certain degree of similarity based on color percentages, layout, or texture. One or more search engines support each search type. The Java APIs also support searching on the result of a previous search and searching involving heterogeneous datastores.

The EIP framework 12 provides a convenient API for Java application users; the applications can be located at local or remote sites. Java classes typically reside on both server and client sides with both sides providing the same interface. The client side of Java classes communicates with the server side to access data in the IBM Content Manager family through the network. Communication between client and server sides is performed by these classes; it is not necessary to add any additional programs.

In particular, FIG. 1 is an architectural diagram outlining the structure of the federated search for Content Management family of repositories using a federated datastore 18, comprised of a federated datastore client 20 and federated datastore server 22.

The federated datastore 18 is a virtual datastore that combines several heterogeneous datastores 24 into a consistent and unified conceptual view. Heterogeneous datastores 24 may comprise, for example, one or more of the following: a Digital Library (DL) datastore 26, an OnDemand (OD) datastore 28, a Visual Info (VI) datastore 30, and a DB2 datastore 32. Each of the heterogeneous datastores 24 is comprised of a back-end server and a back-end client. For example, DL datastore 26 is comprised of back-end DL server 34 and back-end DL client 36.

The consistent and unified conceptual view created by the federated datastore 18 is a federated schema, established via schema mapping 38 of the underlying datastores. The users interact with the federated datastore 18 using the federated schema, without needing to know about the individual heterogeneous datastores 24 that participate in the federated datastore 18. Although shown in different computers, the heterogeneous datastores 24 could alternatively reside on a single computer. If in different computers, the heterogeneous datastores 24 can be remote or co-located.

The federated datastore 18 does require a corresponding back-end client. Because it is a virtual database, the federated datastore 18 relies on the underlying physical back-end client associated with it such as the Digital Library back-end client DL 36, the OnDemand back-end client OD 40, the VisualInfo back-end client VI 42, the DB2 back-end client DB2 44, etc. Schema mapping 38 establishes this association.

The communication between the federated datastore client 20 and federated datastore server 22 can be performed by any appropriate protocol. On top of Java EIP client classes 14, the users can develop application programs using, for example, any existing or available development environment for Java GUI Beans 46.

The federated datastore 18 coordinates query evaluation, data-access, and transaction processing of the participating heterogeneous datastores 24. Given the federated schema, a multi-search query can be formulated, executed, and coordinated to produce results in the form of a datastore-neutral dynamic data object (DDO).

Each heterogeneous datastore 24 and the federated datastore 18 is created using one datastore definition or superclass. The federated datastore 18 and the heterogeneous datastores 24 are all subclasses of a class called Datastore. Consequently, federated datastore 18 and heterogeneous datastores 24 have the same interface and a user would be able to access the federated datastore 18 and the heterogeneous datastores 24 in a consistent and uniform manner.

Additionally, the objects stored in the federated datastore 18 and the heterogeneous datastores 24 are subclasses of a Data Object class. The Data Object class comprises subclasses for dynamic data objects (DDOs) and extended data objects (XDOs). A DDO has attributes, with type value and properties. The value of an attribute can be a reference to another DDO or XDO, or a collection of DDOs or XDOs.

With respect to the notion of "federation", each participating heterogeneous datastore 24 preserves the right to maintain its "personality", i.e., its own query language, data-model or schema, method of interaction, etc., while at the same time cooperating in a federation to provide a federated schema. This design allows the users to preserve the natural view to their favorite (non-federated) datastore 24 as well as access their favorite (non-federated) datastore 24 in conjunction with other heterogeneous datastores 24 in a federated context.

The federated folder system 10 provides the ability to save in a persistent fashion searches performed on the heterogeneous datastores 24. The federated datastore 18 is a virtual datastore, having no physical characteristic. Documents, items, images, etc. found by a search remain stored on their respective heterogeneous datastores 24. The federated folder system 10 creates and stores the federated folder 405 (FIG. 4) containing members stored on heterogeneous datastores 24.

Figure 2:
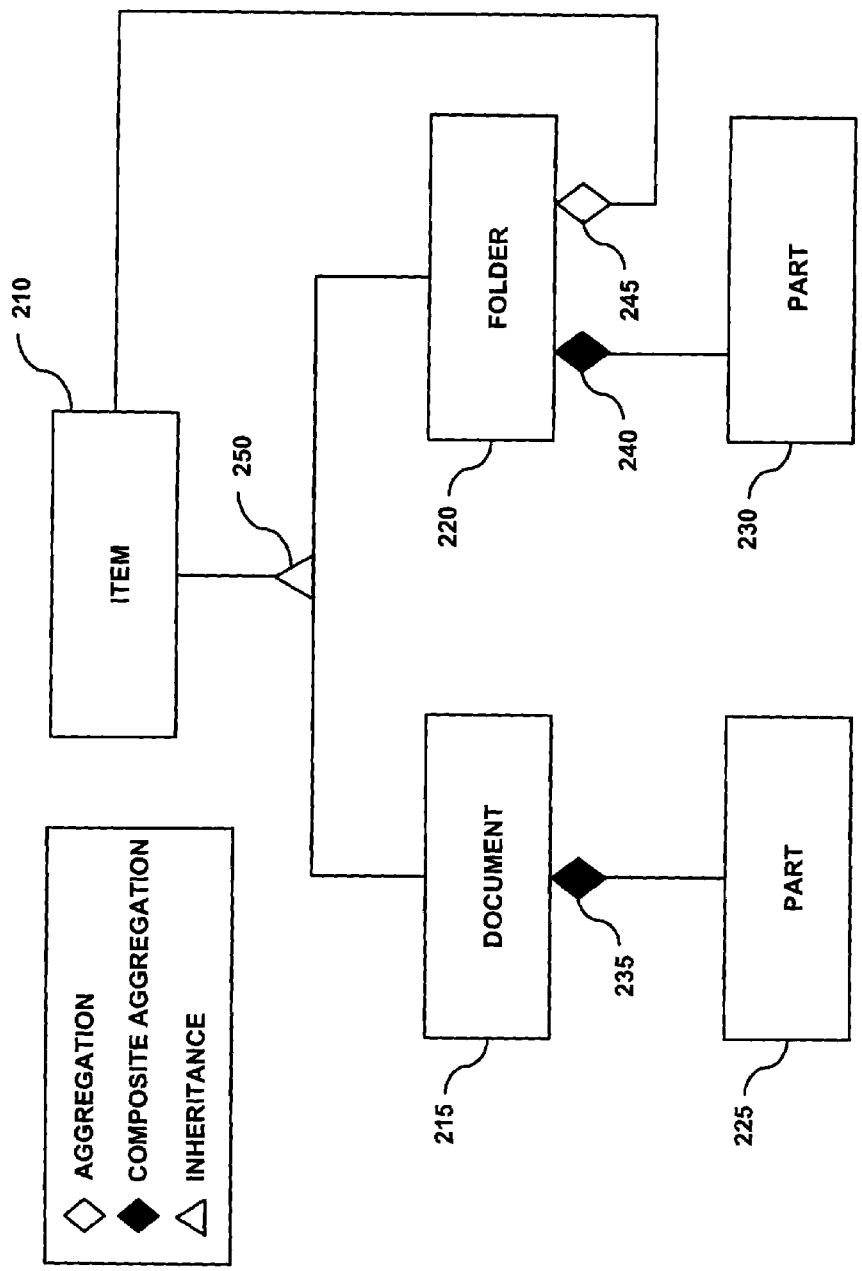
FIG. 2 is a schematic illustration of a high-level architecture of a content management data model, which also serves as a federated content model. This model specifies the concept of a federated folder in which its member may be a document or another folder, thus forming a hierarchy of persistent federated folders as supported by the environment depicted in FIG. 1.

FIG. 2 illustrates a content management data model which specifies the modeling constructs for documents and folders. A folder or a federated folder 220 comprises zero or more item 210. Item 210 in turn can either be a document 215 or a folder 220. Document 215 comprises zero or more part 225 while folder 220 may also comprises zero or more part 230. The black diamonds 235, 240 represent composite aggregation (composite aggregation relationship 235, 240), the open diamond 245 represents an aggregation (aggregation relationship 245), and the open triangle 250 represents inheritance (inheritance 250). In this data model, deleting an instance of folder 220 deletes all instances of part 230, as indicated by composite aggregation relationship 240. However, deleting an instance of folder 220 will not delete all instances of item 210, as indicated by aggregation relationship 245.

The federated folder 220 can be a virtual entity mapped to several entities on heterogeneous datastores 24. The local federated datastore 22, similar to heterogeneous datastores 24, provides an entity to which a federated entity can be mapped. A federated folder 220 can be mapped to another local federated folder 220. Consequently, a local federated entity is not required for each federated entity definition.

Figure 3:
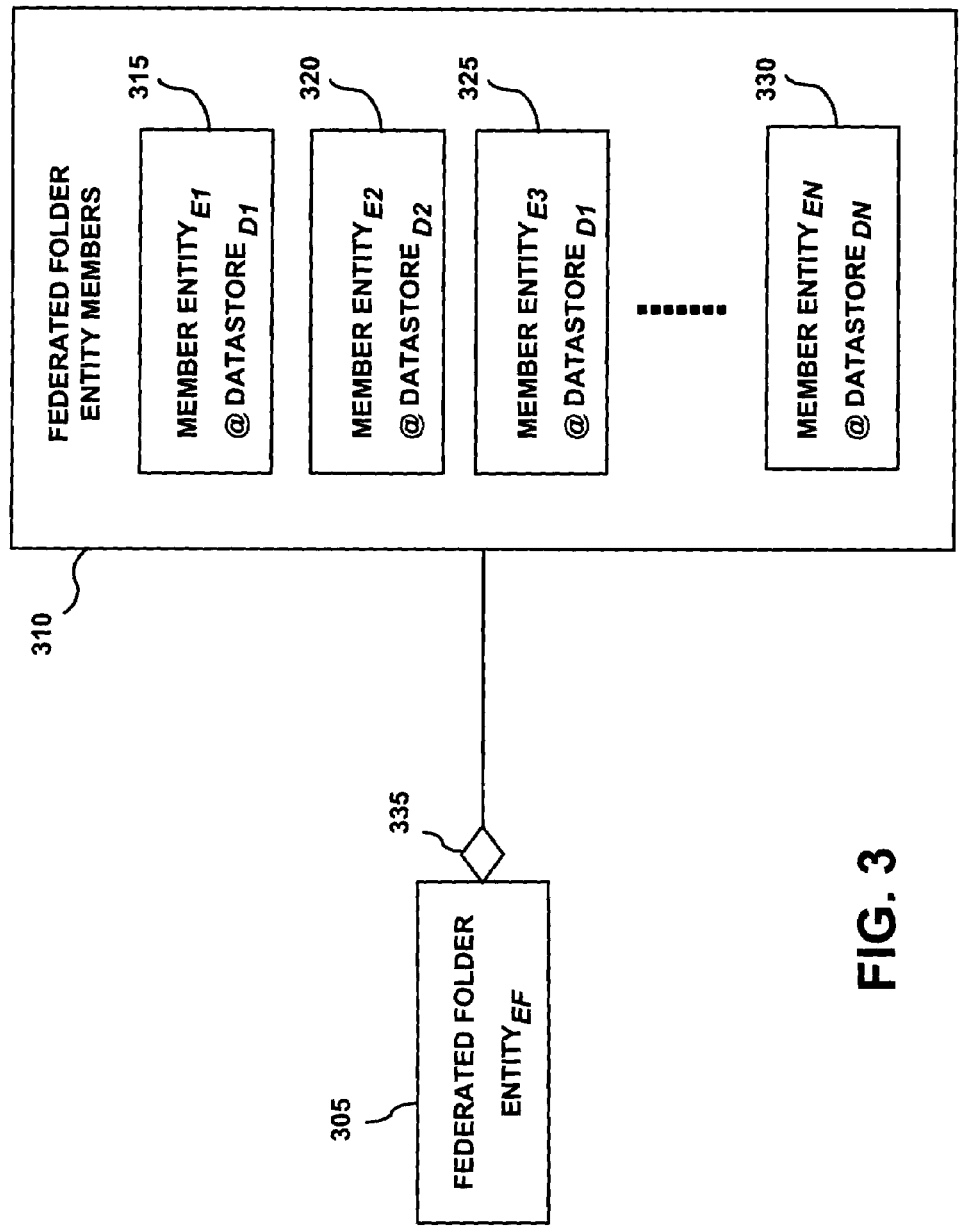
FIG. 3 is a schematic illustration of the entity aspect of the persistent federated folder data model of FIG. 2, depicting a federated folder entity having member entities originating from heterogeneous datastores.

FIG. 3 illustrates the data model of a federated folder 220 depicting the aggregation relationship between the entity of the federated folder and entities of its members. Federated folder entity 305 is comprised of federated folder entity members 310 (also referenced herein as folder entity members 310). Folder entity members 310 are comprised of entities residing on (other) heterogeneous datastores, such as entity$_{E1}$, 315; entity$_{E2}$, 320; entity$_{E3}$, 325, through entity$_{EN}$, 330. Folder entity members 310 are stored in heterogeneous datastores 24. Only the federated folder entity$_{EF}$ 305 for the federated folder system 10 is stored as a local federated entity.

The open or white diamond 335 identifies the relation between the federated folder entity 305 and folder entity members 310. Because instances of folder entity members 310 are stored in heterogeneous datastores 24, the instance federated folder entity 310 does not contain actual copies of the instance of entities within the folder entity members 310. The white diamond 335 specifies an aggregation relationship between the federated folder entity 305 and its folder entity members 310, meaning that an instance of federated folder entity 305 can be deleted without deleting its member instances of folder entity members 310.

FIG. 4 illustrates an instance of federated folder entity 220, federated folder$_{ff}$ 405, based on the model of federated folder entity 305 of FIG. 3. Federated folder members 410 is comprised of documents and folder members originating from (other) heterogeneous datastores. For example, document$_1$ 415 resides on datastore$_{D1}$, folder$_2$ 420 resides on datastore$_{D2}$, document$_3$ 425 resides on datastore$_{D1}$, etc. The relationship between documents or folders within the federated folder members 410 is represented generically by document 430 residing on datastore$_{DN}$. Aggregation relationship 435 indicates that deleting the federated folder$_{ff}$ 405 will not delete the federated folder members 410. Similarly, aggregate relationship 440 indicates that deleting folder$_2$ 420 will not delete its contents on the corresponding datastores.

The local persistent copy of federated folder 405 is created only when the results of the search are mapped to the local persistent store, the user's local heterogeneous datastore 24. The folder members 410 mostly reside in different heterogeneous datastores 24, so only the table of contents or other representative information is saved persistently with the federated folder 405.

The open or white diamond 435 identifies the relation between the federated folders 405 and its folder members 410. Because the folder members 410 are stored in heterogeneous datastores 24, the federated folder 410 does not contain actual copies of the items within the folder members 410. The white diamond 435 specifies an aggregation relationship between the federated folder 405 and its folder members 410, meaning that the federated folder 405 can be deleted without deleting its folder members 410.

As a special case, a federated folder entity 305 may have a recursive relationship within its entity; i.e., the federated folder entity 305 and its folder entity members 310 belong to the same entity as shown in FIG. 5. Federated folder 405 may be any instance of the federated folder entities illustrated in FIG. 2, FIG. 3, or FIG. 5. In this special case, since folder entity members 310 of the federated folder entity 305 belong to the same entity, they must reside in the same datastore.

Figure 6:
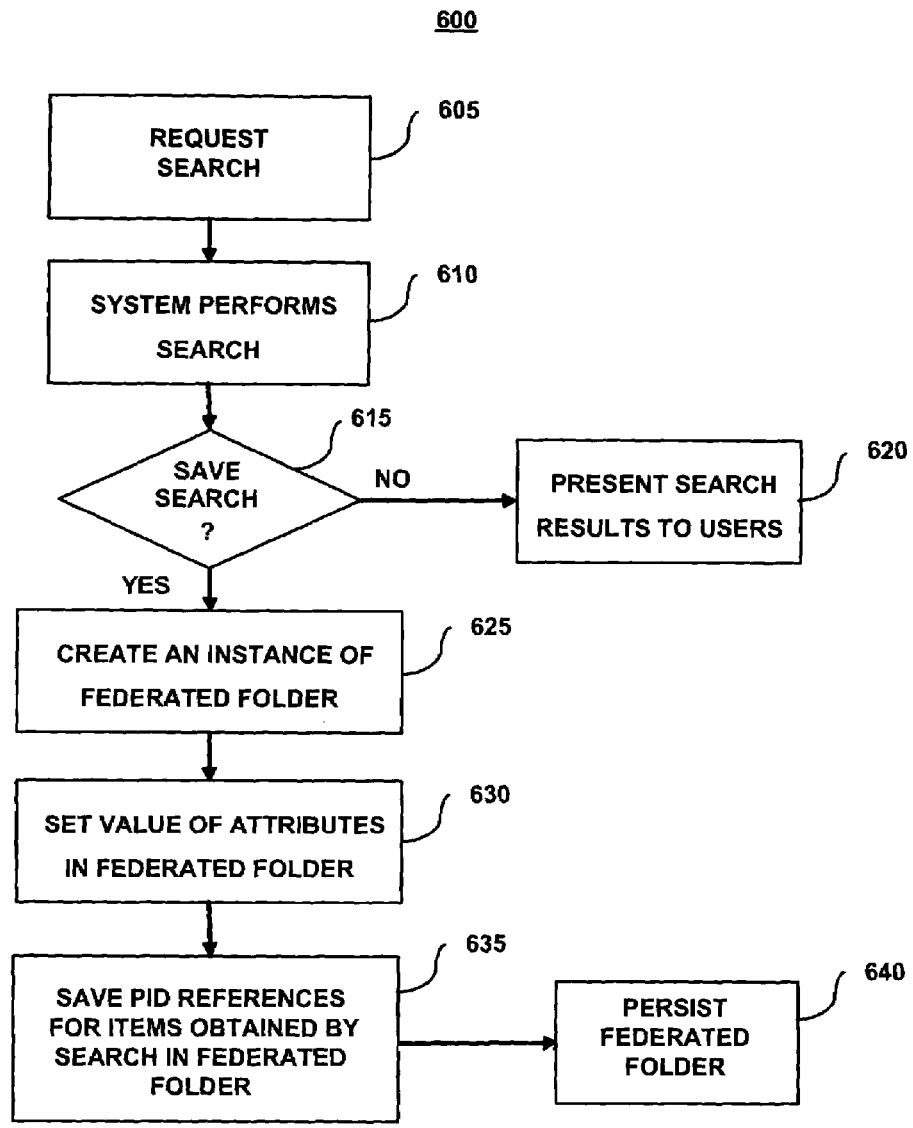
FIG. 6 is a process flow chart illustrating a method of storing the results of a search by the persistent federated folder system of FIG. 1.

FIG. 6 illustrates a method 600 of creating a federated folder 220 using the federated folder system 10. A search request is initiated at block 605. The federated system 10 performs the search at block 610.

The user then determines at decision block 615 whether they wish to save the results of the search. If not, the federated folder system 10 presents the results of the search to the user at block 620.

If, however, the user wishes to save the results of the search at decision block 615, the federated folder system 10 creates an instance of a federated folder 405 at block 625. A federated folder entity 220 can represent a document or a folder. When creating a local federated folder entity 220, the user can specify the attributes they wish to have in the federated folder 405. At block 630 the user sets the value of each attributes into the federated folder 405. Search results are saved into a federated folder 405 as persistent identifier (PID) string references or other representative information at block 635 without actually retrieving the original documents. Finally, the user instructs the federated folder system 10 to store the federated folder 405 into the persistent store at block 640.

Figure 7:
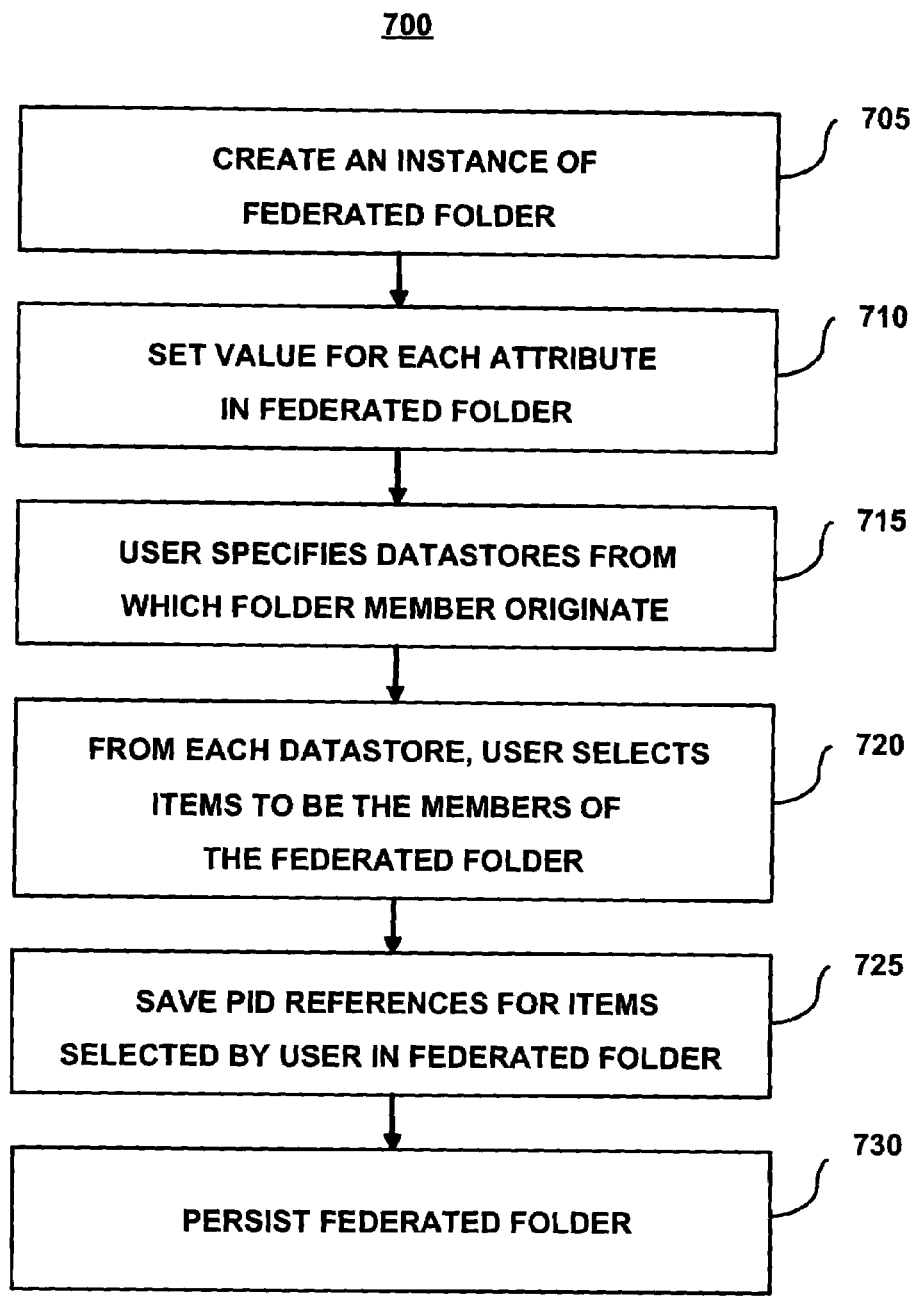
FIG. 7 is a process flow chart illustrating a method of storing documents or items selected by a user by the persistent federated folder system of FIG. 1.

Alternatively, the user can create the federated folder 405 and select documents, images, and so forth, from various heterogeneous datastores 24 for inclusion into the federated folder 405, as illustrated by method 700 of the process flow chart of FIG. 7. The user instructs the federated folder system 10 to create a federated folder 405 at block 705.

When creating a local federated folder entity 220, the user can specify the attributes he or she wishes to have in the federated folder 405 (block 710). The user may specify the source heterogeneous datastore 24 for the folder members 410 at block 715.

Folder members 410 can come from different heterogeneous datastores 24. At block 720, the user selects the items and documents he or she wishes to save in the federated folder 405. Selected items and documents are saved into a federated folder 405 as persistent identifier (PID) string references or other representative information at block 725 without actually retrieving the original documents.

The federated folder and its associated storage structure have the capability to save its instances persistently. The federated folder operations can create, retrieve, update, and/or delete instance of a federated folder in addition to adding, retrieving, updating, and/or deleting its parts and its members. Seamless integration with the federated query is provided to operate on the federated folder transparently regardless of the locality of the user or the heterogeneous datastores 24 the user is searching. The federated folder limits access rights as associated with the users general privileges. The administrative support is provided for creating and administering federated folders. The federated folder system extends the federated content management with full support for federated content model.

It is to be understood that the specific embodiments of the invention that have been described are merely illustrative of certain applications of the principle of the present invention. Numerous modifications may be made to the system and method for managing a persistent federated folder within a federated content management system invention described herein without departing from the spirit and scope of the present invention.

What is claimed is:

1. A processor-implemented method of managing a persistent federated folder within a federated content management system that includes a plurality of heterogeneous federated datastores, the method comprising:
    searching, from a local datastore, the plurality of heterogeneous federated datastores;
    creating the persistent federated folder on the local federated datastore within the federated content management system;
    wherein the persistent federated folder collectively saves federated search results from each of the respective heterogeneous federated datastores, to act as a container in a workflow process, and to act as a container for a set of objects with similar characteristics, and is further stored in a non-transient manner to permit data stored in the persistent federated folder to be queried with a federated query;
    mapping the persistent federated folder includes a virtual entity mapped to a plurality of entities in the local federated datastores;
    updating the persistent federated folder by modifying a members list, and updating attributes of the persistent federated folder; and
    selectively deleting the persistent federated folder,
    wherein deleting the persistent federated folder does not delete items referenced in the persistent federated folder.

2. The method of claim 1, wherein modifying the members list comprises adding at least one new member.

3. The method of claim 1, wherein modifying the members list comprises removing at least one member.

4. The method of claim 1, further comprising selecting items in the plurality of entities as a result of a search.

5. The method of claim 1, further comprising a user selecting items in the plurality of entities.

6. The method of claim 1, further comprising an application selecting items in the plurality of entities.

7. The method of claim 4, further comprising saving a persistent identifier reference in the persistent federated folder for each of the items in the entities selected as a result of the search.

8. The method of claim 5, further comprising saving a persistent identifier reference in the persistent federated folder for each of the items in the entities selected by the user.

9. The method of claim 6, further comprising saving a persistent identifier reference in the persistent federated folder for each of the items in the entities selected by the application.

10. The method of claim 1, wherein the persistent federated folder contains at least one persistent federated folder.

11. The method of claim 1, wherein the persistent federated folder contains members from entities originating from heterogeneous datastores.

12. The method of claim 1, wherein the persistent federated folder contains members from an entity of the persistent federated folder.

13. The method in claim 1, wherein the persistent federated folder integrates seamlessly within the federated content management system allowing a federated query to operate transparently with respect to a client.

14. The method in claim 1, wherein the persistent federated folder system limits access rights of users according to users' general privileges.

15. The method in claim 1, further comprising providing administrative support for creating, mapping, and administering the persistent federated folder.

16. The method of claim 1, wherein the federated folder is defined using a query expression executable in the federated datastore.

17. The method of claim 16, wherein the query expression is executed by the federated datastore to materialize the content of the federated folder.

18. A computer readable storage medium encoded with a computer program product for managing a persistent federated folder within a federated content management system that includes a plurality of heterogeneous federated datastores, the computer program product comprising:
   a first set of instruction codes for searching, from a local federated datastore, the plurality of heterogeneous federated datastores;
   a second set of instruction codes for creating the persistent federated folder on the local federated datastore within the federated content management system;
   wherein the persistent federated folder collectively saves federated search results from each of the respective heterogeneous federated datastores, to act as a container in a workflow process, and to act as a container for a set of objects with similar characteristics, and is further stored in a non-transient manner to permit data stored in the persistent federated folder to be queried with a federated query;
   a third set of instruction codes for mapping the persistent federated folder includes a virtual entity mapped to a plurality of entities in the local federated datastores;
   a fourth set of instruction codes for updating the persistent federated folder by modifying a members list, and updating attributes of the persistent federated folder; and
   a fifth set of instruction codes for selectively deleting the persistent federated folder,
   wherein the fifth set of instruction codes does not delete items referenced in the persistent federated folder.

19. The computer program product of claim 18, wherein the third set of instruction codes modifies the members list by adding at least one new member.

20. The computer program product of claim 18, wherein the third set of instruction codes modifies the members list by removing at least one member.

21. The computer program product of claim 18, wherein the persistent federated folder contains members from entities originating from heterogeneous datastores.

22. The computer program product of claim 18, wherein the persistent federated folder contains members from an entity of the persistent federated folder.

23. The computer program product in claim 18, wherein the persistent federated folder system limits access rights of users according to users' general privileges.

24. A processor-implemented system for managing a persistent federated folder within a federated content management system that includes a plurality of heterogeneous federated datastores, the system comprising:
   means for searching, from a local datastore, the plurality heterogeneous federated datastores;
   means for creating the persistent federated folder on the local federated datastore within the federated content management system;
   wherein the persistent federated folder collective saves federated search results from each of the respective heterogeneous federated datastores, to act as a container in a workflow process, and to act as a container for a set of objects with similar characteristics, and is further stored in a non-transient manner to permit data stored in the persistent federated folder to be queried with a federated query;
   means for mapping the persistent federated folder includes a virtual entity mapped to a plurality of entities in the local federated datastores;
   means for updating the persistent federated folder by modifying a members list, and updating attributes of the persistent federated folder; and
   means for selectively deleting the persistent federated folder.
   wherein the means for deleting does not delete items referenced in the persistent federated folder.

25. The system of claim 24, wherein the means for updating modifies the members list by adding at least one new member.

26. The system of claim 24, wherein the means for updating modifies the members list by removing at least one member.

27. The system of claim 24, wherein the persistent federated folder contains members from entities originating from heterogeneous datastores.

* * * * *